(12) United States Patent
Jones et al.

(10) Patent No.: US 9,536,370 B2
(45) Date of Patent: Jan. 3, 2017

(54) ELECTRONIC PARKING METER MECHANISM WITH WIRELESS COMMUNICATION ANTENNA

(71) Applicant: Duncan Parking Technologies, Inc., Milwaukee, WI (US)

(72) Inventors: Gavin Jones, Carlsbad, CA (US); Balu Subramanya, Darnestown, MD (US); Ryan Vincent, Solana Beach, CA (US); Steven A. Jones, San Marcos, CA (US); Amith S. Belawadi, Chino Hills, CA (US)

(73) Assignee: Duncan Parking Technologies, Inc., Milwaukee, WI (US)

( * ) Notice: Subject to any disclaimer, the term of this patent is extended or adjusted under 35 U.S.C. 154(b) by 0 days.

(21) Appl. No.: 14/599,236

(22) Filed: Jan. 16, 2015

(65) Prior Publication Data

US 2015/0129391 A1    May 14, 2015

Related U.S. Application Data

(63) Continuation of application No. PCT/US2013/021201, filed on Jan. 11, 2013.
(Continued)

(51) Int. Cl.
*G06M 1/00* (2006.01)
*G06M 3/00* (2006.01)
(Continued)

(52) U.S. Cl.
CPC ........... *G07F 17/246* (2013.01); *G06Q 20/322* (2013.01); *G06Q 20/34* (2013.01);
(Continued)

(58) Field of Classification Search
CPC .... G07D 11/00; G07D 13/00; G07D 2205/00; G07D 3/14; G07D 3/16; G07D 5/00; G07D 7/00; G07D 9/00; G07D 9/04; G07D 11/0084; G07D 2207/00; G07D 2211/00; G07F 3/00; G07F 3/02; G07F 3/04; G07F 5/22; G07F 7/00; G07F 7/02; G07F 7/025; G07F 7/04; G07F 7/06; G07F 7/08; G07F 9/003; G07F 9/08; G07F 17/24; G07F 15/12; G06M 1/00; G06M 3/00; B65H 2701/1912; H01Q 1/40; H01Q 1/42; H01Q 1/243; H01Q 1/244; G09F 23/00; G09F 2023/0008; G07B 15/00; G07B 15/02; G08G 1/14; G08G 1/07; G08G 1/08; G08G 1/09; G08G 1/10; G08G 1/11; G08G 1/12; G08G 1/13; G08G 1/065; G06Q 30/0284; G06Q 2240/00; Y10S 194/90; Y10S 194/902; B60Q 1/48; B60T 2201/10; E04H 6/42; G07C 1/30; G07C 5/02; G04F 10/08; G04F 5/16; G04F 1/00; G04F 3/00; G04F 8/08
(Continued)

(56) References Cited

U.S. PATENT DOCUMENTS

D100,875 S    8/1936  Michaels
D101,237 S    9/1936  Miller
(Continued)

FOREIGN PATENT DOCUMENTS

CA    2770093    5/2012
JP    08-305998    11/1996
(Continued)

OTHER PUBLICATIONS

U.S. Appl. No. 29/503,319, filed Sep. 25, 2014, Jones et al.
(Continued)

*Primary Examiner* — Jeffrey Shapiro
(74) *Attorney, Agent, or Firm* — Hunton & Williams LLP

(57) ABSTRACT

An electronic single-space parking meter mechanism is provided. The electronic single-space parking meter mechanism includes an inner housing having a front side and a rear
(Continued)

side. The meter mechanism includes wireless communications hardware including an antenna. The meter mechanism includes a payment reader supported by the inner housing and an electronic display screen supported by the inner housing. At least a portion of the antenna is located above at least a portion of the electronic display screen.

17 Claims, 10 Drawing Sheets

Related U.S. Application Data

(60) Provisional application No. 61/673,850, filed on Jul. 20, 2012.

(51) Int. Cl.
  *G07F 9/08* (2006.01)
  *G07F 17/24* (2006.01)
  *G06Q 30/02* (2012.01)
  *G07B 15/02* (2011.01)
  *G06Q 20/32* (2012.01)
  *G06Q 20/34* (2012.01)

(52) U.S. Cl.
  CPC ....... *G06Q 20/352* (2013.01); *G06Q 30/0284* (2013.01); *G07B 15/02* (2013.01); *G07F 17/24* (2013.01); *G07F 17/242* (2013.01); *G07F 17/248* (2013.01); *G06Q 2240/00* (2013.04)

(58) Field of Classification Search
  USPC ......... 343/872; 194/205, 206, 215–217, 302, 194/350, 900, 902; 368/7, 90; 340/932.2; 705/13, 418; 702/176; D10/42; 40/337
  See application file for complete search history.

(56) References Cited

U.S. PATENT DOCUMENTS

| | | |
|---|---|---|
| D112,677 S | 12/1938 | Broussard et al. |
| 2,483,805 A | 10/1949 | Broussard et al. |
| 2,495,784 A | 1/1950 | Starts |
| 2,550,433 A | 4/1951 | Tichenor |
| 2,594,388 A | 4/1952 | Broussard |
| D166,753 S | 5/1952 | Jones |
| 2,596,122 A | 5/1952 | Broussard |
| 2,596,123 A | 5/1952 | Broussard |
| 2,596,124 A | 5/1952 | Broussard |
| 2,613,792 A | 10/1952 | Broussard et al. |
| 2,613,871 A | 10/1952 | Broussard et al. |
| 2,618,371 A | 11/1952 | Broussard |
| 2,633,960 A | 4/1953 | Broussard |
| D181,359 S | 11/1957 | Jones |
| 2,818,371 A | 12/1957 | Wessinger |
| 2,822,682 A | 2/1958 | Sollenberger |
| 2,985,978 A | 5/1961 | Breen et al. |
| 2,995,230 A | 8/1961 | Moody et al. |
| D200,216 S | 2/1965 | Broussard |
| 3,199,321 A | 8/1965 | Sollenberger |
| 3,204,438 A | 9/1965 | Sollenberger |
| 3,262,540 A | 7/1966 | Sollenberger et al. |
| 3,272,299 A | 9/1966 | Sollenberger |
| 3,438,031 A | 4/1969 | Fathauer |
| 3,486,324 A | 12/1969 | Andersson |
| 3,519,113 A | 7/1970 | Arzig et al. |
| 3,565,283 A | 2/1971 | Sciacero et al. |
| 3,999,372 A | 12/1976 | Welch et al. |
| 4,248,336 A | 2/1981 | Fiedler |
| 4,872,149 A | 10/1989 | Speas |
| 4,880,406 A | 11/1989 | Van Horn et al. |
| 5,060,777 A | 10/1991 | Van Horn et al. |
| 5,088,073 A | 2/1992 | Speas |
| 5,109,972 A | 5/1992 | Van Horn et al. |
| 5,119,916 A | 6/1992 | Carmen et al. |
| 5,155,614 A | 10/1992 | Carmen et al. |
| 5,184,707 A | 2/1993 | Van Horn et al. |
| 5,244,070 A | 9/1993 | Carmen et al. |
| 5,273,151 A | 12/1993 | Carmen et al. |
| 5,382,780 A | 1/1995 | Carmen |
| 5,407,049 A | 4/1995 | Jacobs |
| 5,526,662 A | 6/1996 | Diekhoff et al. |
| 5,617,942 A | 4/1997 | Ward, II et al. |
| 5,642,119 A * | 6/1997 | Jacobs ........................... 342/69 |
| 5,710,743 A | 1/1998 | Dee et al. |
| 5,732,812 A | 3/1998 | Grainger et al. |
| 5,805,083 A | 9/1998 | Sutton et al. |
| 5,806,651 A | 9/1998 | Carmen et al. |
| 5,841,369 A | 11/1998 | Sutton et al. |
| 5,852,411 A | 12/1998 | Jacobs et al. |
| 5,903,520 A | 5/1999 | Dee et al. |
| 5,966,345 A | 10/1999 | Dee et al. |
| 6,037,880 A | 3/2000 | Manion |
| 6,098,361 A | 8/2000 | Roten et al. |
| 6,109,418 A | 8/2000 | Yost |
| 6,111,522 A | 8/2000 | Hiltz et al. |
| 6,116,403 A | 9/2000 | Kiehl |
| D431,788 S | 10/2000 | Tuxen et al. |
| RE37,193 E | 5/2001 | Ward, II et al. |
| 6,229,455 B1 | 5/2001 | Yost et al. |
| 6,230,868 B1 | 5/2001 | Tuxen et al. |
| 6,243,029 B1 | 6/2001 | Tomer |
| 6,275,170 B1 | 8/2001 | Jacobs et al. |
| 6,309,098 B1 | 10/2001 | Wong |
| 6,312,152 B2 | 11/2001 | Dee et al. |
| 6,354,425 B1 | 3/2002 | Tuxen et al. |
| 6,373,442 B1 * | 4/2002 | Thomas et al. ................ 343/767 |
| D461,728 S | 8/2002 | Tuxen et al. |
| 6,505,774 B1 | 1/2003 | Fulcher et al. |
| 6,747,575 B2 | 6/2004 | Chauvin et al. |
| 6,874,340 B1 | 4/2005 | Berman |
| 6,889,899 B2 | 5/2005 | Silberberg |
| 7,019,670 B2 | 3/2006 | Bahar |
| 7,237,176 B2 | 6/2007 | Briggs et al. |
| D575,168 S | 8/2008 | King et al. |
| D587,141 S | 2/2009 | King et al. |
| 7,579,964 B2 | 8/2009 | Nath et al. |
| 7,617,120 B2 | 11/2009 | Derasmo et al. |
| 7,806,248 B2 | 10/2010 | Hunter et al. |
| 7,825,826 B2 | 11/2010 | Welch |
| 7,854,310 B2 | 12/2010 | King et al. |
| 7,950,570 B2 | 5/2011 | Marchasin et al. |
| D652,329 S | 1/2012 | Mackay et al. |
| D654,816 S | 2/2012 | Mackay et al. |
| RE43,245 E | 3/2012 | Ouimet et al. |
| 8,138,950 B1 | 3/2012 | Leung |
| D659,557 S | 5/2012 | Jones et al. |
| 8,184,019 B2 | 5/2012 | Chauvin et al. |
| 8,193,540 B2 | 6/2012 | Huang et al. |
| 8,310,403 B2 * | 11/2012 | Nahar ........................... 343/719 |
| 8,395,532 B2 * | 3/2013 | Chauvin et al. ........... 340/932.2 |
| D684,870 S | 6/2013 | Jones et al. |
| 8,631,921 B2 | 1/2014 | Jones et al. |
| 8,662,279 B2 | 3/2014 | Jones et al. |
| 8,684,158 B2 | 4/2014 | Jones et al. |
| 8,727,207 B1 | 5/2014 | Church et al. |
| D716,156 S | 10/2014 | Jones et al. |
| D716,671 S | 11/2014 | Jones et al. |
| 2001/0012241 A1 | 8/2001 | Dee et al. |
| 2002/0030606 A1 | 3/2002 | Chauvin et al. |
| 2002/0074344 A1 | 6/2002 | Long et al. |
| 2003/0017904 A1 | 1/2003 | Lee |
| 2003/0112151 A1 | 6/2003 | Chauvin et al. |
| 2003/0128136 A1 | 7/2003 | Spier et al. |
| 2003/0144905 A1 | 7/2003 | Smith |
| 2004/0160905 A1 | 8/2004 | Bernier et al. |
| 2004/0264302 A1 * | 12/2004 | Ward, II .......................... 368/90 |
| 2005/0168352 A1 | 8/2005 | Tomer |
| 2006/0173733 A1 | 8/2006 | Fancher |
| 2008/0071611 A1 | 3/2008 | Lovett |

(56) References Cited

U.S. PATENT DOCUMENTS

| | | | |
|---|---|---|---|
| 2008/0277468 A1 | 11/2008 | Mitschele | |
| 2009/0026842 A1 | 1/2009 | Hunter et al. | |
| 2009/0095593 A1 | 4/2009 | King et al. | |
| 2009/0099761 A1 | 4/2009 | Davis et al. | |
| 2009/0159674 A1 | 6/2009 | King et al. | |
| 2009/0183966 A1* | 7/2009 | King et al. | 194/217 |
| 2009/0192950 A1 | 7/2009 | King et al. | |
| 2009/0267732 A1* | 10/2009 | Chauvin et al. | 340/5.53 |
| 2009/0287578 A1 | 11/2009 | Paluszek et al. | |
| 2010/0153193 A1 | 6/2010 | Ashby et al. | |
| 2010/0314901 A1* | 12/2010 | Glasgo | 296/136.07 |
| 2011/0022427 A1 | 1/2011 | Dayan | |
| 2011/0057815 A1 | 3/2011 | King et al. | |
| 2011/0060653 A1* | 3/2011 | King et al. | 705/14.58 |
| 2011/0276519 A1* | 11/2011 | MacKay et al. | 705/418 |
| 2012/0222935 A1* | 9/2012 | MacKay et al. | 194/210 |
| 2012/0285790 A1 | 11/2012 | Jones et al. | |
| 2012/0286036 A1 | 11/2012 | Jones et al. | |
| 2012/0286968 A1 | 11/2012 | Jones et al. | |
| 2014/0108107 A1 | 4/2014 | Jones et al. | |

FOREIGN PATENT DOCUMENTS

| | | |
|---|---|---|
| JP | 2011-060206 | 3/2011 |
| KR | 10-2000-0016671 | 3/2000 |
| KR | 10-2001-0028481 | 4/2001 |
| KR | 10-2008-0041730 | 5/2008 |
| WO | WO 00/59201 | 10/2000 |
| WO | WO 02/063570 | 8/2002 |
| WO | WO 2012/154902 | 11/2012 |
| WO | WO 2012/154913 | 11/2012 |
| WO | WO 2014/014494 | 1/2014 |

OTHER PUBLICATIONS

U.S. Appl. No. 14/155,062, filed Jan. 14, 2014, Salama.

Duncan Solutions, Eagle CK Single-Space Meter Mechanism Brochure, believed to be commercially available before May 10, 2010, 2 pages.

Duncan Solutions, Eagle 2100 Single-Space Meter Mechanism Brochure, believed to be commercially available before May 10, 2010, 2 pages.

Duncan Solutions, VM/VS Pay-by-Space Multi-Space Meter Brochure, available at http://www.duncansolutions.com/pdfs/VM.pdf, believed to be commercially available before May 10, 2010, 2 pages.

International Search Report and Written Opinion for International Application No. PCT/US2013/021201, mailing date Apr. 30, 2013, 13 pages.

Duncan Solutions, Parking and Enforcement From Start to Finish, Intermec CN50, available at http://www.duncansolutions.com/IntermecCN50.html, believed to be commercially available before May 10, 2010, 2 pages.

Duncan Solutions, Parking and Enforcement From Start to Finish, Motorola MC75, available at http://www.duncansolutions.com/MotorolaMC75.html, believed to be commercially available before May 10, 2010, 1 page.

Duncan Solutions, AutoCITE X3 Handheld Computer Brochure, available at http://www.duncansolutions.com/pdfs/X3.pdf, believed to be commercially available before May 10, 2010, 2 pages.

AutoISSUE Automated Citation Issuance System Brochure, believed to be commercially available before May 10, 2010, 2 pages.

Duncan Solutions, AutoTRAX Meter Management System Brochure, believed to be commercially available before May 10, 2010, 2 pages.

* cited by examiner

ELECTRONIC PARKING METER MECHANISM WITH WIRELESS COMMUNICATION ANTENNA

CROSS-REFERENCE TO RELATED PATENT APPLICATIONS

This application is a continuation of International Application No. PCT/US2013/021201, filed Jan. 11, 2013, which claims the benefit of U.S. Provisional Patent Application No. 61/673,850, filed Jul. 20, 2012, which is incorporated herein by reference in its entirety.

BACKGROUND OF THE INVENTION

The present invention relates generally to the field of parking meter systems, devices and methods. The present invention relates specifically to a parking meter system equipped for wireless communication.

Single-space parking meters are typically associated with a single parking space. To utilize an individually metered parking space, a motorist typically inserts money into the parking meter, and the parking meter displays an amount of time related to the amount of money inserted. A multi-space meter typically provides a single payment location for more than one parking spot, and the multi-space meter receives payment and tracks meter time for the multiple parking spots. For either type of meter, the motorist may park at the metered spot for the amount of parking time purchased. When the time on the meter expires, the motorist may move their car or add more time to the meter. If the meter expires and the motorist remains parked at the meter, a parking enforcement officer may issue a parking ticket. A city or other entity may operate a city wide system of single-space parking meters and/or multi-space meters.

SUMMARY OF THE INVENTION

One embodiment of the invention relates to an electronic single-space parking meter mechanism. The electronic single-space parking meter mechanism includes an inner housing including a front side and a rear side. The electronic single-space parking meter mechanism includes wireless communications hardware supported by the inner housing configured to wirelessly communicate with a parking management system, and the wireless communications hardware includes an antenna. The electronic single-space parking meter mechanism includes a payment reader supported by the inner housing and an electronic display screen supported by the inner housing. At least a portion of the antenna is located above at least a portion of the electronic display screen.

Another embodiment of the invention relates to an electronic parking meter mechanism for inserting into a preexisting outer meter housing. The electronic parking meter mechanism includes an inner housing including a front side and a rear side. The electronic parking meter mechanism includes wireless communications hardware supported by the inner housing configured to wirelessly send and receive data, and the wireless communications hardware includes an antenna. The electronic parking meter mechanism includes a solar panel supported by the inner housing and an electronic display screen supported by the inner housing. At least a portion of the antenna is located above the solar panel.

Another embodiment of the invention relates to a single-space parking meter assembly including an electronic meter mechanism and an outer housing. The electronic meter mechanism includes an inner housing including a front side and a rear side and also includes wireless communications hardware supported by the inner housing configured to wirelessly send and receive data. The wireless communications hardware includes an antenna. The electronic meter mechanism includes an electronic display screen supported by the inner housing. The outer housing includes a base defining a cavity sized to receive a lower portion of the electronic meter mechanism and a cap configured to be coupled to the base over an upper portion of the electronic meter mechanism. The outer housing includes a window supported by the cap, and the window has a lower edge and an upper edge. The electronic display screen is supported by the inner housing at a position such that the display is viewable through the window after the cap is coupled to the base, and the antenna is supported by the inner housing at a position such that the antenna is above the lower edge of the window after the cap is coupled to the base.

Another embodiment of the invention relates to an electronic single-space parking meter mechanism including an inner housing, a wireless communications antenna supported by the inner housing, a payment reader supported by the inner housing, and an electronic display screen supported by the inner housing. At least a portion of the antenna is located above the vertical midpoint of the meter mechanism.

Another embodiment of the invention relates to an electronic single-space parking meter configured to be located within an outer meter housing and associated with a parking space. The electronic single-space parking meter includes an inner housing, a wireless communications antenna supported by the inner housing, a credit card mag-strip reader supported by the inner housing, a currency reader including a slot for receiving currency, a display screen supported by the inner housing, a solar panel located below the display screen, a keypad and a meter control system supported by the inner housing. The meter control system communicably coupled to the wireless communications antenna, the credit card mag-strip reader, the currency reader, the display and the keypad. The meter control system is configured to transmit data received from at least one of the credit card mag-strip reader, the currency reader and the keypad to a parking management system via the wireless communications antenna. The wireless communication antenna is supported by the inner housing at a position such that data is transmittable from the wireless communications antenna to the parking management system from within the outer meter housing.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, various embodiments of a wirelessly communicating single-space parking meter and a parking system utilizing such parking meters are disclosed herein. Generally, the single-space meters discussed herein include an electronic meter mechanism that includes various electronic devices (e.g., wireless communication equipment, multifunctional electronic display, various payment devices, vehicle sensor, power supply, and/or control electronics, etc.). Typically, the inner electronic meter mechanism is located within an outer housing when in use. In various embodiments, inner electronic meter mechanism includes wireless communications hardware that includes one or more antennas configured to wirelessly send and receive data. In various embodiments discussed herein, the antenna of the inner electronic meter mechanism is supported from the housing of the electronic meter mechanism such that the antenna is permitted to send and receive data from within the protective, outer meter housing. In various embodiments discussed herein, the inner electronic meter mechanism is structured to include a complete wireless communication hardware package that is sized to fit within a standard single-space meter outer housing, without the need to restructure or remake the outer housing.

Figure 1:
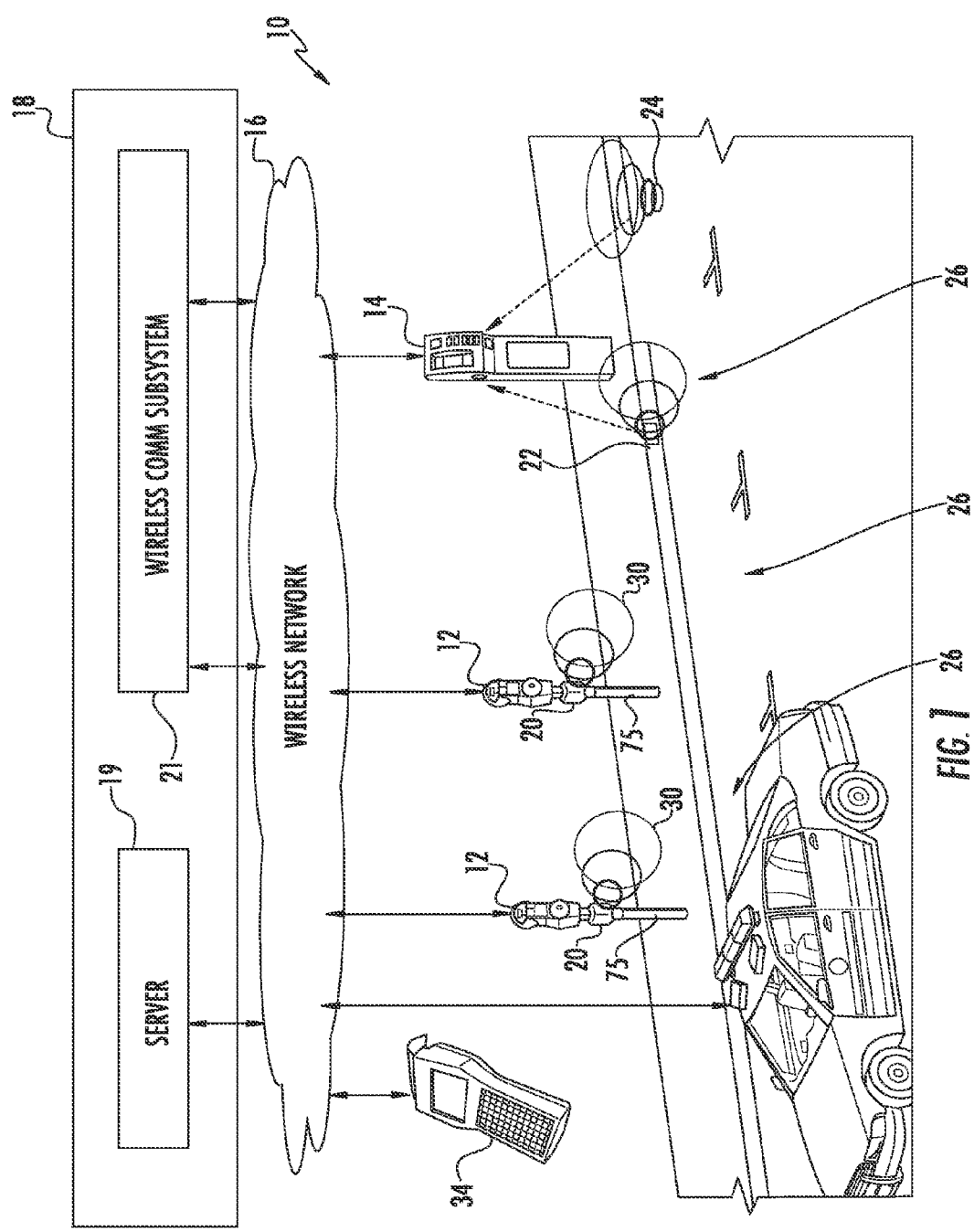
FIG. 1 is a parking system according to an exemplary embodiment.
Figure 2:
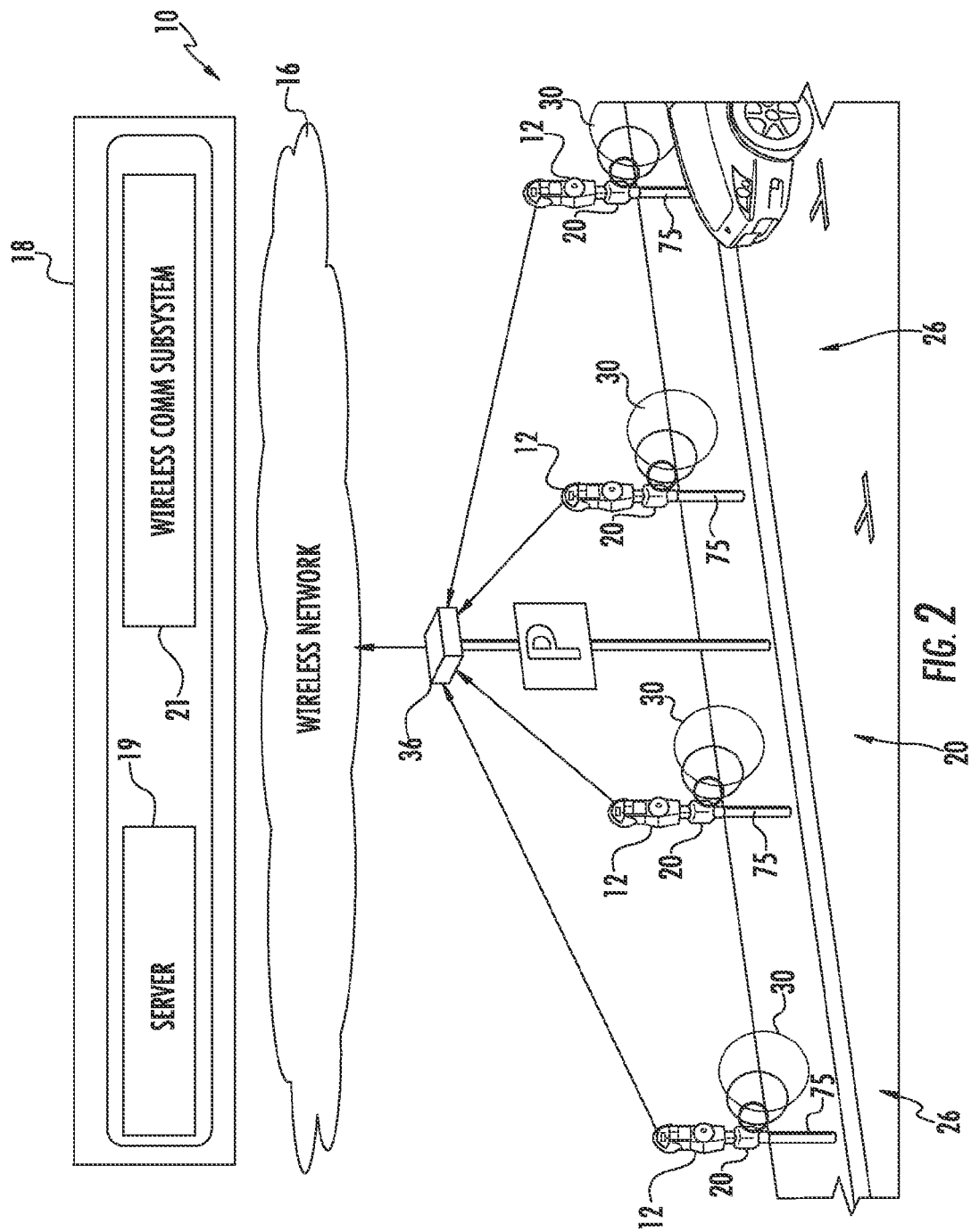
FIG. 2 is a parking system according to an exemplary embodiment.
Figure 3:
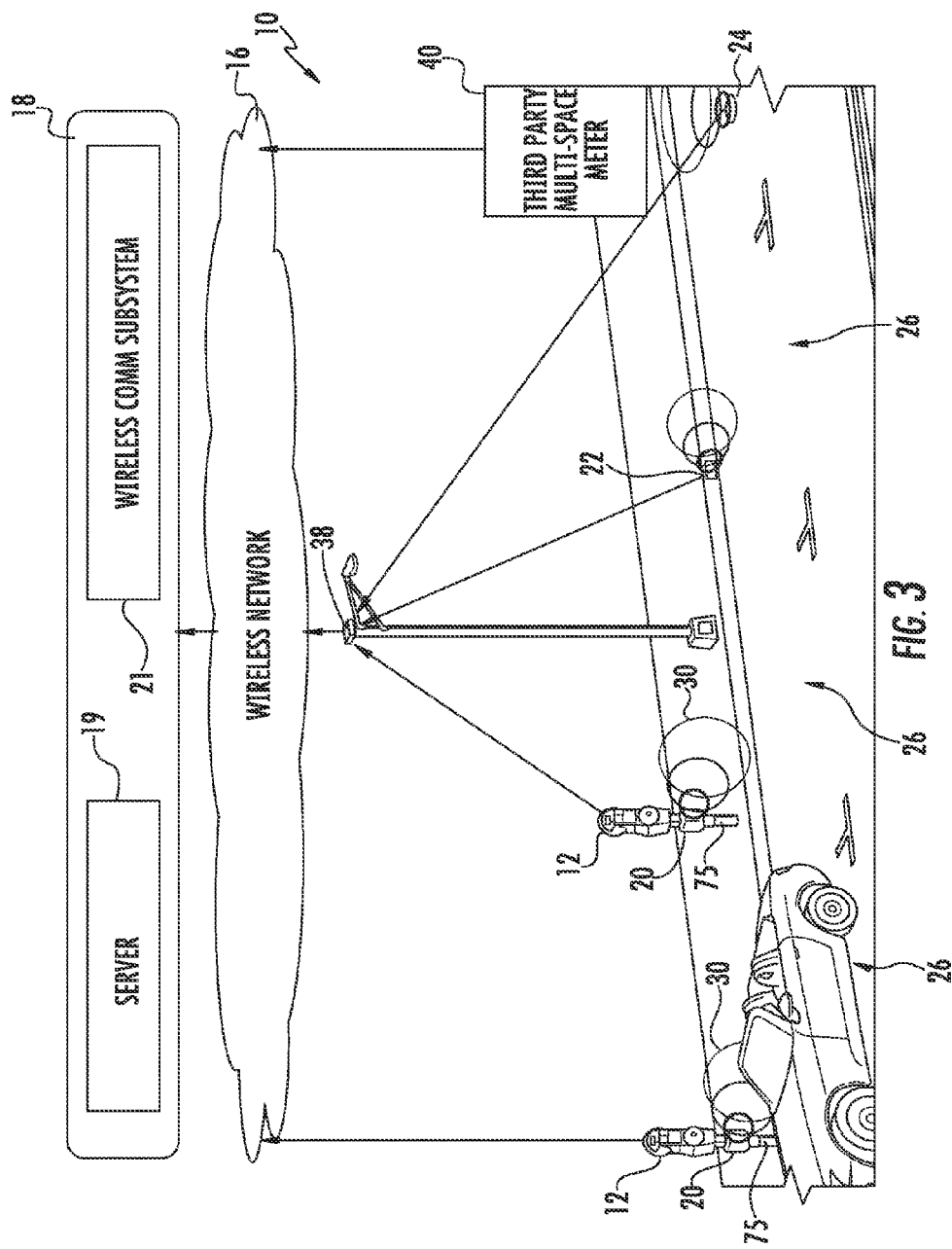
FIG. 3 is a parking system according to an exemplary embodiment.

Referring to FIGS. 1, 2 and 3, various exemplary embodiments of parking system 10 are shown. In the exemplary embodiment of FIG. 1, parking system 10 includes one or more single-space parking meters 12, one or more multi-space parking meters 14, a communication network, shown as wireless network 16, and a parking system control system, shown as parking management system 18. Both single-space meters 12 and multi-space meter 14 may be configured to communicate with parking management system 18 by directly accessing wireless network 16. In various embodiments, wireless network 16 may be a mobile telephone system, and meters 12 and 14 may access wireless network 16 utilizing standard mobile telephone systems (e.g., GSM, GPRS, EDGE, etc.).

In various embodiments, meters 12 and 14 are configured to communicate parking meter data to parking management system 18 via wireless network 16. Parking management system 18 is a computerized, server system that includes a parking database that provides for processing, storage and management of data within parking system 10. In one embodiment shown in FIG. 1, parking management system 18 includes at least one server 19 and wireless communications subsystem 21. Server 19 is configured to store and process parking data associated with a particular parking spot (e.g., current parking space occupancy information, current meter time, vehicle sensor data, information regarding mode of payment, vehicle arrival information, vehicle departure information, parking rates, location information, etc.), including parking data received wirelessly from the meters, to generally provide various parking system functions. For example, parking management system 18 may be configured to use data from meters to set parking rates, schedule parking enforcement activities, detect expired meters, determine real-time occupancy rates, track meter payments, etc. Wireless communications hardware 21 of parking management system 18 is configured to allow server 19 to communicate wirelessly with the various components of parking system 10 discussed herein.

Server 19 is configured to store and generate data that may be communicated wirelessly to the various components of parking system 10, and in this embodiment, wireless communication hardware 21 is configured to transmit system data and/or information from server 19 to the appropriate component of the parking system. For example, wireless communication hardware 21 is configured to transmit, and meters 12 and 14 are configured to receive information from parking management system 18 via wireless network 16. The system data transmitted from parking management system 18 and received by the parking meters 12 and 14 may include parking meter configuration data, parking rate data, time and date data, testing and diagnostic data, parking meter software updates, etc.

In various embodiments, parking system 10 also includes one or more vehicle sensors, shown as pole-mount vehicle sensors 20, curb surface-mount sensor 22 and street surface-mount sensor 24. Generally, sensors 20, 22 and 24 are each associated with a single parking space 26 and are configured to detect the presence of a vehicle located in the associated parking space, to detect entry of a vehicle into the associated parking space and/or to detect the exit of a vehicle from the associated parking space. In the embodiment of FIG. 1, a pole-mount sensor 20 is associated with and in communication with each single-space meter 12, and sensors 22 and 24 are associated with and in communication with multi-space meter 14. In other embodiments, a subterranean sensor may be located beneath the surface of the parking spot in place of street surface-mount sensor 24. In other embodiments, a curb surface-mount sensor 22, a street surface-mount sensor 24 or subterranean sensor, may be associated with a single-space meter 12 instead of pole-mount sensor 20. Generally, vehicle sensors 20, 22 and 24 are directional sensors (i.e., sensor that only senses in a particular region or direction) and include a targetable detection zone 30. Generally, the vehicle sensors are positioned such that the targetable detection zone 30 is located within the parking space associated with the meter and is not located in adjacent parking spaces.

Vehicle sensors 20, 22 and 24 are configured to detect one or more aspect (e.g., presence, entry, exit, etc.) of a vehicle within the parking spot associated with the sensor and to generate a signal indicative of the detected aspect of the vehicle. The generated signal is then communicated from the sensor to a controller associated with the parking meter for the parking spot. In various embodiments, communication from the sensors to the associated meter may be either through wired or wireless communication. The parking meter may execute various functions (e.g., update time on the meter, restrict further parking in the space, determine the meter is expired, etc.) in response to the detected aspect of the vehicle and may send data to and/or receive data from parking management system 18 in response to the detected aspect of the vehicle. In addition, data generated by the vehicle sensor associated with each meter (e.g., data related to the presence of a vehicle within the space associated with the meter) may be communicated to parking management system 18 via the wireless communications hardware of the meter.

Generally, the vehicle sensors include a sensing element (e.g., an electromagnetic energy transmitter and receiver, transceiver, etc.) located within a sensor housing. Sensors 20, 22 and 24 may be sensors configured to utilize electromagnetic energy to detect the presence of the vehicle in the parking space, and specifically, sensors 20, 22 and 24 may be a radiofrequency (RF) sensor including a radiofrequency-based sensing element. In other embodiments, sensors 20, 22 and 24 may be any sensors suitable for detecting an aspect of a vehicle in the associated parking space. For example, sensors 20, 22 and 24 may be infrared reflectance sensors, ultrasonic sensors, capacitance sensors, proximity sensors, magnetic sensors, magnetic-flux sensors, non-intrusive sensors, radar-based sensors, a low power/broad spectrum radar sensor, time of flight sensors, ranging sensors, etc.

As shown in FIG. 1, parking system 10 may include one or more mobile citation units, shown as handheld unit 34. Handheld unit 34 communicates with parking management system 18 via wireless network 16. In the embodiment shown in FIG. 1, handheld unit 34 includes wireless communications hardware for communication with parking management system 18 via wireless network 16. Handheld unit 34 is carried by parking enforcement personnel and is used to issue citations for parking violations. Handheld unit 34 sends various types of enforcement data (e.g., data indicating issuance of a citation, data related to the type of citation issued, location of parking violation, vehicle identification information, etc.) to parking management system 18 via wireless network 16. Handheld unit 34 also receives various information from parking management system 18. In one embodiment, handheld unit 34 receives information to facilitate the issuances of citations. For example, handheld unit 34 may receive data indicative of the existence and location of expired meters. In one embodiment, handheld unit 34 may receive data regarding which meters within a certain distance from unit 34 are expired. It should be understood that while the figures show a handheld citation unit, other mobile citation units may be used within parking system 10. For example, a mobile citation unit may be mounted within a vehicle driven by enforcement personnel.

Referring to FIG. 2, parking system 10 is shown according to another exemplary embodiment. In this embodiment, parking system 10 includes a plurality of single-space meters 12 each having a pole-mounted vehicle sensor 20 coupled to pole 75, a wireless network 16 and a parking management system 18. This embodiment of parking system 10 includes a gateway 36, and single-space meters 12 are configured for short-range communication with gateway 36. In this embodiment, gateway 36 provides the communication link between multiple meters 12 and parking management system 18 via wireless network 16. In one such embodiment, single-space meters 12 are configured for short-range RF communication with gateway 36, and gateway 36 is configured for communication (e.g., cellular, WIFI, etc.) with parking management system 18 via wireless network 16. Communication between meters 12 and gateway 36 may be via any suitable RF communication technology, standard, or protocol (e.g., WIFI, IEEE 802.15.4, Bluetooth, ZigBee, etc.). Parking system 10 may also include one or more multi-space parking meter 14 in place of, or in addition to, single-space meters 12. In such an embodiment, the multi-space meter may also communicate with gateway 36 using a wireless, RF technology.

Referring to FIG. 3, another embodiment of parking system 10 is shown including a gateway 38 and a multi-space meter 40. In this embodiment, parking system 10 includes one or more stand-alone vehicle sensors, such as curb surface-mount sensor 22 and street surface-mount sensor 24, configured to monitor occupancy of the parking spaces associated with multi-space meter 40. In this embodiment, gateway 38 receives wireless communication from both single-space meters 12 and the stand-alone vehicle sensors (i.e., sensor 22 and sensor 24). Gateway 38 communicates information received from meters 12 and sensors 22 and 24 to parking management system 18 via wireless network 16. Multi-space meter 40 communicates directly with parking management system 18 via wireless network 16. In this embodiment, parking management system 18 is configured to properly associate the data received from the stand-alone vehicle sensors with the data for the appropriate parking space received from multi-space meter 40.

Also as shown in FIG. 3, parking system 10 may be configured to provide compatibility between parking meters made by different companies. For example, in one embodiment, parking meters 12 may be produced by a first company or manufacturer and multi-space meter 40 may be made by a second company or manufacturer. In this embodiment, sensors 20, 22 and 24 may be compatible with meters made by different companies. Further, parking management system 18 is configured to receive, store and process data received from parking meters or vehicle sensors made by different companies. This allows current, installed single-space and multi-space meters manufactured by different companies to be upgraded to provide the wireless communications and vehicle sensing functionalities discussed herein.

Referring to FIGS. 1, 2 and 3, parking system 10 includes a plurality of single-space meters 12 (e.g., 2, 3, 4, . . . 50, . . . 100, more than 2, more than 10, more than 20, more than 50, more than 100, etc., single-space meters), and may include one or more multi-space parking meters 14.

Figure 4:
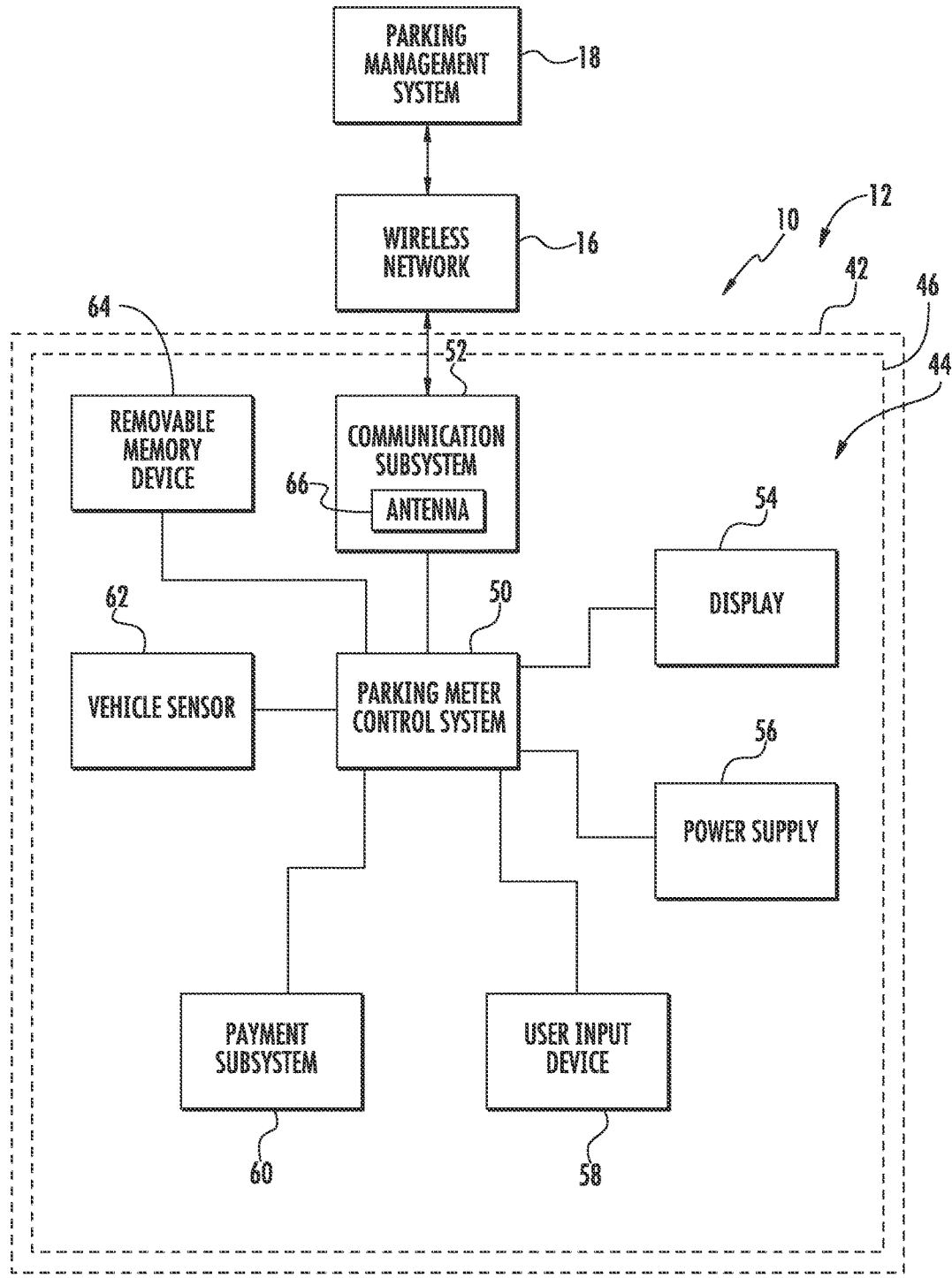
FIG. 4 is a block diagram of a parking system according to an exemplary embodiment.

Referring to FIG. 4, a block diagram of parking system 10 is shown according to an exemplary embodiment, and includes a single-space electronic parking meter 12. It should be understood that parking system 10 may include a plurality of single-space parking meters 12 and may include one or more multi-space meters 14 as discussed above. As shown in FIG. 4, single-space meter 12 includes an outer housing 42 and an inner electronic meter mechanism 44 located within outer housing 42. Electronic meter mechanism 44 includes an inner housing 46 that supports the electronics of electronic meter mechanism 44.

FIG. 4 also shows a block diagram of the components and device of electronic meter mechanism 44. In the embodiment shown, meter mechanism 44 includes a parking meter control system 50, a communication subsystem 52, a display 54, a power supply 56, a user input device 58, a payment subsystem 60, a vehicle sensor 62 and a removable memory device 64. Parking meter control system 50 is communicably coupled to communication subsystem 52, display 54, power supply 56, user input device 58, payment subsystem 60, vehicle sensor 62 and removable memory device 64. Parking meter control system 50 may generally be any electronic control unit suitable to provide the various parking meter functionalities discussed herein. For example control system 50 may include one or more processing circuits having hardware (e.g., processors, memory, communication interfaces, etc.) and/or software configured to control the operation of parking meter 12 as discussed herein. In one embodiment, control system 50 includes two processors that each control various device of meter mechanism 44.

Communication subsystem 52 includes hardware and/or software for communicating data between parking meter control system 50 and parking management system 18 via wireless network 16. As shown in FIG. 1 communication subsystem 52 may be a communication subsystem associated with a single-space parking meter 12 that is configured to communicate data between the associated meter and parking management system 18 via wireless network 16 utilizing standard mobile telephone communication systems (e.g., GSM, GPRS, EDGE, etc.). In various embodiments, communication subsystem 52 includes various communications hardware, including an antenna 66 coupled to a wireless communication circuit. Antenna 66 is configured to send and receive data from electronic meter mechanism 44. As shown schematically in FIG. 4, antenna 66 is physically supported by inner housing 46 of electronic meter mechanism 44. As discussed in more detail below, antenna 66 is structured and positioned relative to inner housing 46 such that communication is permitted while electronic meter mechanism 44 is located within the protective, outer housing 42. As shown, in FIGS. 2 and 3, communication subsystem 52 may include shorter range communication hardware and software physically coupled to single-space parking meter 12. In this embodiment, data is communicated from single-space meter 12 to the gateway, and the gateway communicates the information to parking management system 18. In one embodiment, control system 50 includes a dedicated communications processor that is configured to handle wireless communications, and in another embodiment, control system 50 includes one or more multipurpose processor that provides for control of wireless communications along with control of other devices.

Single-space meter 12 also includes a display 54 that displays various parking related information (e.g., parking rate, current time and date, time remaining on meter, a meter expired message, user operation instructions, hours of meter operation, meter status information, user information during replacement, maintenance and data extraction processes, etc.) to the user of single-space meter 12. Display 54 may be a graphical high contrast, low power display. The display may be color or monochrome. Display 54 may be an LED display or LCD display. In various embodiments, display 54 includes both a front facing screen on the sidewalk facing side of the meter and a rear facing screen on the street facing side of the meter.

Single-space meter 12 also includes a power supply 56 suitable to power the functions of single-space meter 12 discussed herein. In one embodiment, power supply 56 may include one or more solar cells or solar panels and one or more self-sustained energy storage devices (e.g., rechargeable batteries, ultracapacitors, etc.). In other embodiments, power supply 56 may be wired AC power supply.

Single-space meter 12 also includes a user input device 58 that allows the user to interact with and operate the meter. In one embodiment, user input device 58 is a four button keypad that provides tactile feedback and/or audible feedback to the user. Single-space meter 12 also includes a payment subsystem 60 configured to receive and process payment for parking. In one embodiment, payment subsystem 60 includes currency reader (e.g., a money or coin slot and a money detector, a bill slot and bill detector, etc.), a credit-card, mag-strip reader, a smart card reader, and/or a "pay by phone" system. Further, single-space meter 12 also includes a vehicle sensor 62 (e.g., pole-mount vehicle sensors 20, curb surface-mount sensor 22 and street surface-mount sensor 24 as shown in FIGS. 1, 2 and 3) that communicates information to control system 50 regarding an aspect of a vehicle in the parking space associated with meter 12.

Single-space meter 12 includes a removable, read-write memory device 64. Generally, removable memory device 64 stores information and/or software that can be utilized by single-space meter 12 to allow single-space meter 12 to operate properly based on the physical location of meter 12 within parking system 10 and based upon the particular parking system 10 (e.g., meter configurations specialized for a particular city such display of city name). Generally removable memory device 64 stores the information and/or software in a computer or electronics readable form. Memory device 64 provides a mechanism by which new data or programming can be provided to electronic meter mechanism 44. For example, in various embodiments, memory device 64 may store location identification information representative of the physical location of outer meter housing 42 that the new meter mechanism is being installed into. Memory device 64 may also include payment information representative of parking payments received by the meter. Memory device 64 may also include meter mechanism configuration data. Configuration data may include rate information (e.g., information indicating the parking rate and parking times that the rate applies), display configuration files (e.g., data that is used by the meter mechanism controller to display the appropriate information on the electronic display screen of the meter) and meter software/firmware (e.g., the appropriate software/firmware versions that allow the meter mechanism to operate within the particular parking system).

In one embodiment, memory device 64 is generally a portable, removable, read-write memory device (e.g., a serial memory device, a memory card, a memory stick, a datakey, etc.). Memory device 64 generally includes one or more electrical contacts configured to contact mating contacts located within meter mechanism 44. In one embodiment, memory device 64 may be a serial flash memory device. In other embodiments, memory device 64 may be other types of removable, read-write memory device including for example, CompactFlash, microSD, miniSD, USB flash, etc.

Figure 5:
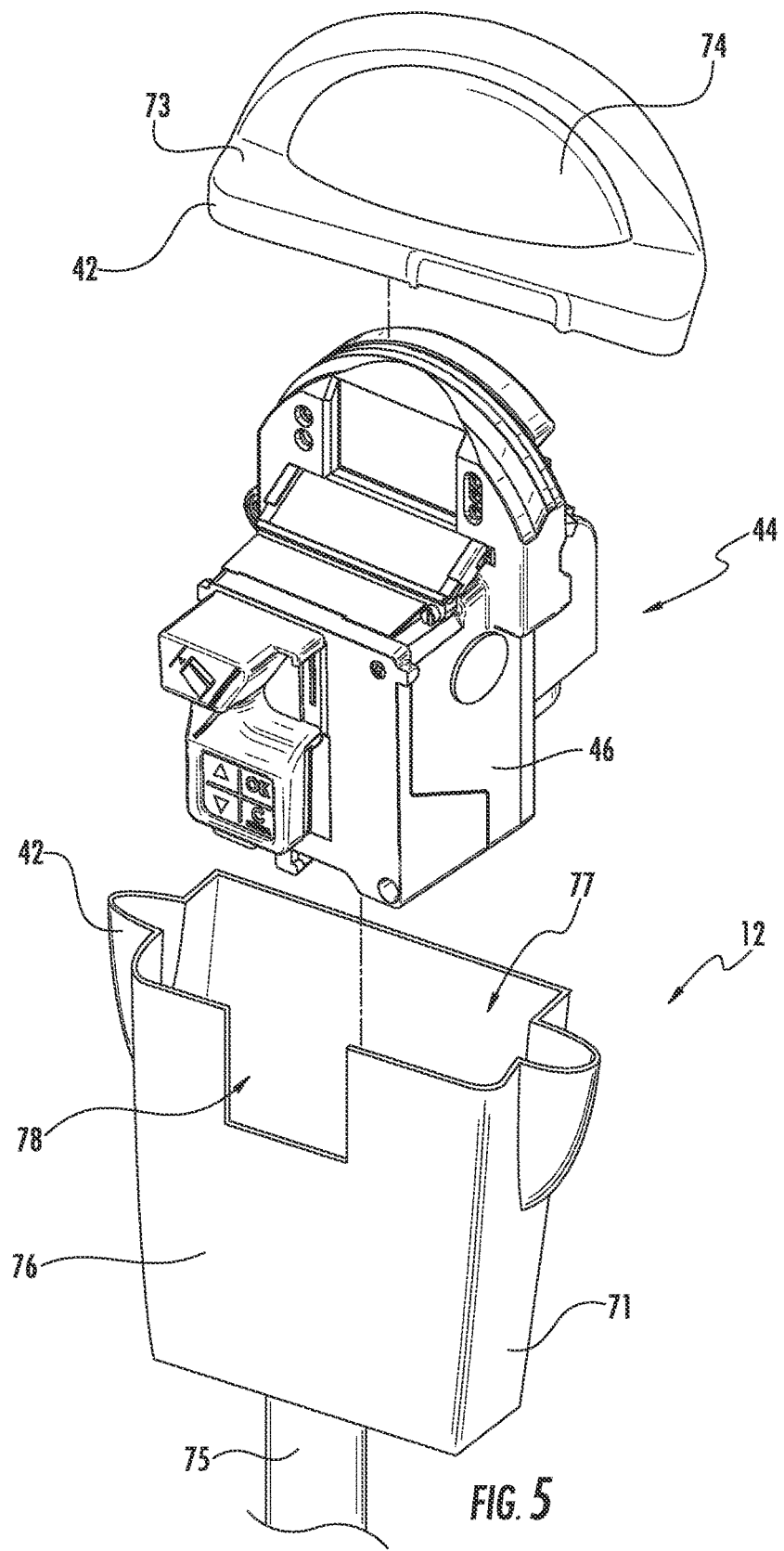
FIG. 5 is an exploded view of a single-space parking meter according to an exemplary embodiment.

Referring to FIG. 5 an exploded view of single-space meter 12 is shown according to an exemplary embodiment. As noted above, single-space meter 12 includes an outer housing 42 and an electronic meter mechanism 44. Outer housing 42 acts to protect electronic meter mechanism 44 and may include a locking mechanism to prevent unwanted access to meter mechanism 44. Outer housing 42 includes a base or lower base 71 and a cap portion 73. Cap 73 of outer housing 42 includes a transparent portion or window 74 which allows the user to view the display of electronic meter mechanism 44 when it is locked within outer housing 42. Lower portion 71 of outer housing 42 is coupled to an upper end of a support structure or pole 75 that supports meter 12. Lower portion 71 of outer housing 42 has an interior cavity 77 (shown in FIG. 5) and a front (i.e., sidewalk facing) face 76 having a payment device opening, shown as an aperture 78. To assemble meter 12, electronic meter mechanism 44 is received within cavity 77 and cap 73 is coupled to base 71 such that electronic meter mechanism 44 is secured within housing 42. In this arrangement, a lower portion of meter mechanism 44 is located within cavity 77, and cap 73 is located over and covering an upper portion of meter mechanism 44. Generally in this arrangement, the keypad and payment device of electronic meter mechanism 44 extend through aperture 78 such that a motorist or other user is able to operate meter 12 and the display of electronic meter mechanism 44 is visible through window 74.

Figure 6:
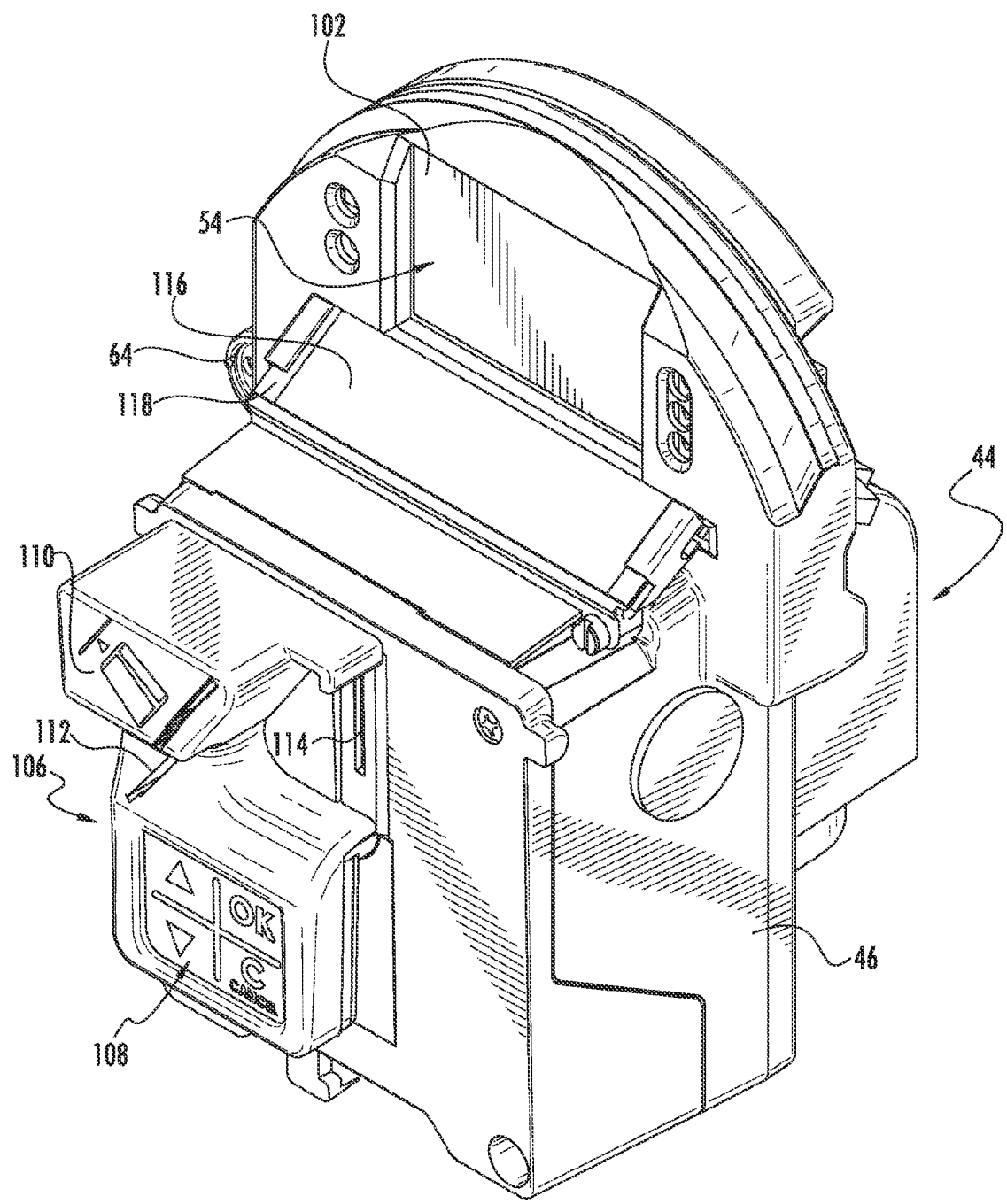
FIG. 6 is a front view of an electronic single-space parking meter mechanism according to an exemplary embodiment.

Referring to FIG. 6, electronic meter mechanism 44 is shown according to an exemplary embodiment. As noted above, electronic meter mechanism 44 includes an inner housing 46 that supports the various components and electronics of electronic meter mechanism 44. Inner housing 46 is generally the shell or structure that encases and supports the electronics of meter mechanism 44. Inner housing 46 also couples to or engages the inner surface of outer housing 42 such that electronic meter mechanism 44 may be supported by and secured to outer housing 42. As discussed above, electronic meter mechanism 44 includes an electronic display 54, which displays information to the user. In one embodiment, display 54 includes a first screen viewable from the front of meter mechanism 44, shown as front display 102, and a second screen viewable from the rear of meter mechanism 44, shown as rear display 104 in FIG. 7.

Generally, meter mechanism 44 includes a payment receiving structure or system including one or more payment devices configured to receive payment from a motorist (e.g., a credit card reader, a currency reader, a smart card reader, etc.). In addition, meter mechanism 44 includes a user input device (e.g., a keypad, touch screen, buttons, switches, etc.) that receives inputs from the motorist in order to operate the parking meter. Typically, the payment receiving structure and the user input device is located on the front side of the inner housing such that the motorist is located on the sidewalk when applying payment to the meter or interacting with the user input device.

Electronic meter mechanism 44 includes an integrated payment and user-interface structure 106 that extends outward from the front side of inner housing 46. Structure 106 includes both at least the physical, payment receiving components of both the payment subsystem 60 and the user input device 58. Structure 106 is an extended portion of the inner housing that supports both the payment receiving structure and the user input device of meter mechanism 44. In the embodiment shown, user input device 58 is a four button interface 108 including up and down arrow keys, an OK button and a cancel button. In the embodiment shown, payment subsystem 60 includes a hybrid card reader including both a smart card reader 110 and a credit card mag strip reader 112. Payment subsystem 60 also includes a money slot, shown as coin slot 114, and located within structure 106 is a currency reader that detects currency (coins in the example shown) that passes through coin slot 114. In other embodiments, the money slot and currency reader may be configured to accept and detect paper money.

Smart card reader 110 may be configured to read a variety of smart-card type payment cards, for example, smart-card credit cards, smart-card debit cards, proprietary parking payment smart cards, etc. Credit card reader 112 may be configured to read a variety of mag-strip based payment cards, including mag-strip credit cards, mag-strip debit cards, proprietary parking mag-strip payment credit cards, etc. In another embodiment, payment subsystem 60 also includes an RF based payment system configured to read an RFID tag associated with the vehicle (e.g., iPass), and to process a parking payment to a pre-registered account associated with the vehicle's RFID tag.

Electronic meter mechanism 44 includes a front solar panel 116 that provides power to operate electronic meter 44 and to charge a rechargeable battery located inside inner housing 46. Inner housing 46 includes a front shelf, shown as shelf 118, upon which front solar panel 116 is mounted. Further, shelf 118 extends from the front surface (i.e., the sidewalk facing surface) of inner housing 46 and is positioned below (i.e., at a lower position as measured along the vertical axis of the meter mechanism) front display 102. Electronic meter mechanism 44 also include a rear solar panel 120 (shown in FIG. 7) that is similar to solar panel 90 but located on the rear (i.e., street-facing side of the meter mechanism). In other embodiments, electronic meter mechanism 44 may include one solar panel or more than two solar panels.

Figure 7:
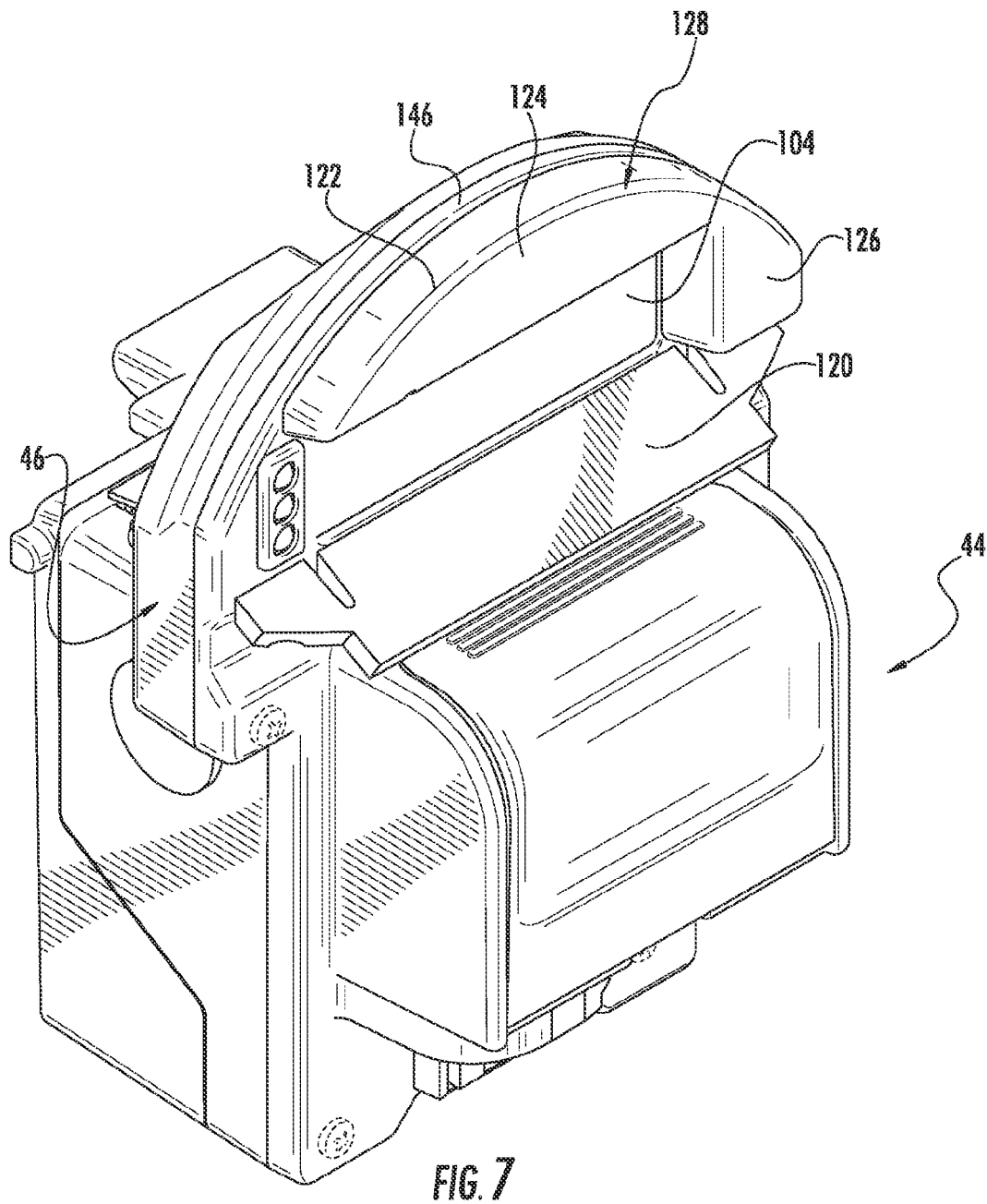
FIG. 7 is a rear view from above of the electronic single-space parking meter mechanism of FIG. 6.

Referring to FIG. 7, the rear side or street facing side of electronic meter mechanism 44 is shown. As noted above, electronic meter mechanism 44 includes rear display 104 and a rear solar panel 120. Rear solar panel 120 is located on a shelf that extends outward and away from a position below rear display 104.

As discussed above, electronic meter mechanism 44 is configured to provide wireless communication from the single-space meters to parking management system 18. In one embodiment, electronic meter mechanism 44 may include cellular communications hardware (e.g., GPRS modem, antenna, etc.) located within and/or coupled to inner housing 46. In another embodiment, electronic meter mechanism 44 includes RF communications hardware (e.g., point-to-multipoint RF modem, antenna, etc.). In such embodiments, electronic meter mechanism 44 includes the appropriate wireless communication antenna 66 (shown in FIG. 4) located within antenna housing 122. Antenna housing 122 generally encloses antenna 66 such that antenna 66 is in the proper arrangement and protects antenna 66 from damage or disruption that may otherwise occur during transportation or shipment.

Figure 8:
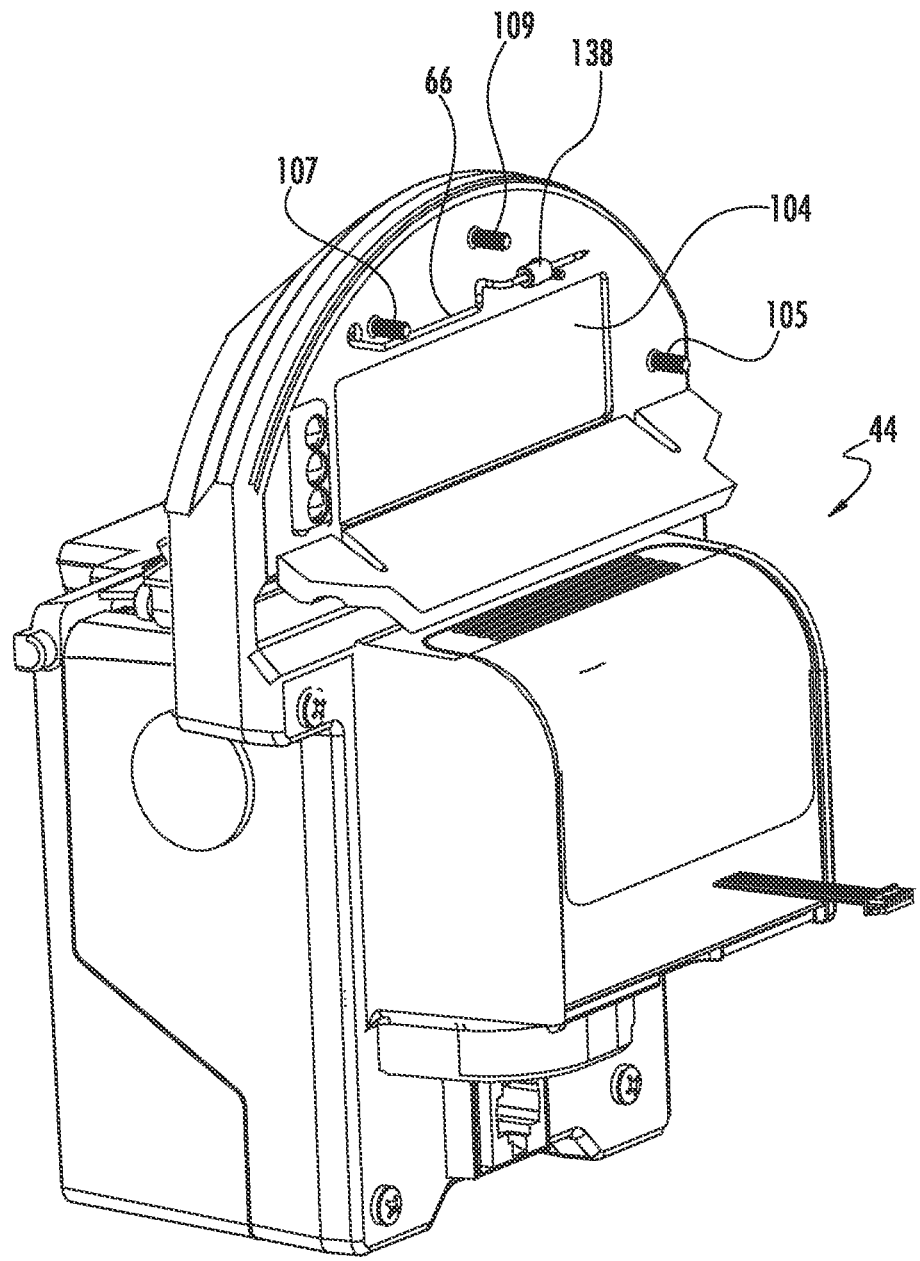
FIG. 8 is the view of FIG. 7 with the antenna housing removed according to an exemplary embodiment.

Antenna housing 122 is a cover or shell that is a part of inner housing 46 and that is configured and located to permit antenna 66 to transmit and receive data while electronic meter mechanism is located within outer housing 42. Referring to FIG. 8, electronic meter mechanism 44 is shown with antenna housing 122 removed to show antenna 66 supported by inner housing 46. As shown, antenna 66 is located above (i.e., at a higher position as measured along the vertical axis of the meter mechanism) rear display 104 and is positioned horizontally and parallel to the upper edge of rear display 104. Inner housing 46 includes a bracket or collar 138 that receives the distal end of antenna 66. Collar 138 acts to support antenna 66 and to space antenna from the outer surface of inner housing 46. In various embodiments, antenna 66 is located in the upper half of or above the vertical midpoint of inner housing 46.

Referring back to FIG. 7, antenna housing 122 generally extends outward and rearward from the rear face of inner housing 46. More specifically, antenna housing 122 extends rearward such that antenna housing 122 extends beyond both rear display 104. Antenna housing 122 includes an upper portion 124 and a lateral portion 126. Upper portion 124 is located above rear display 104 and extends horizontally along the upper edge of rear display 104. Upper portion 124 includes an upper surface 128. Upper surface 128 is a continuously curved surface that curves upward from the lateral left and right most edges of antenna housing 122. As shown, curved upper surface 128 reaches its maximum height at about the midpoint of rear display 104. Curved upper surface 128 is shaped to substantially match the curve of the uppermost surface of inner housing 46, shown as crown 146, and also substantially matches the curve of the inner surface of cap 73. Lateral portion 126 extends downward from a lateral portion of upper portion 124 along a lateral edge of rear display 104. In the embodiment shown, lateral portion 126 extends downward along the right lateral edge of rear display 104.

Figure 9:
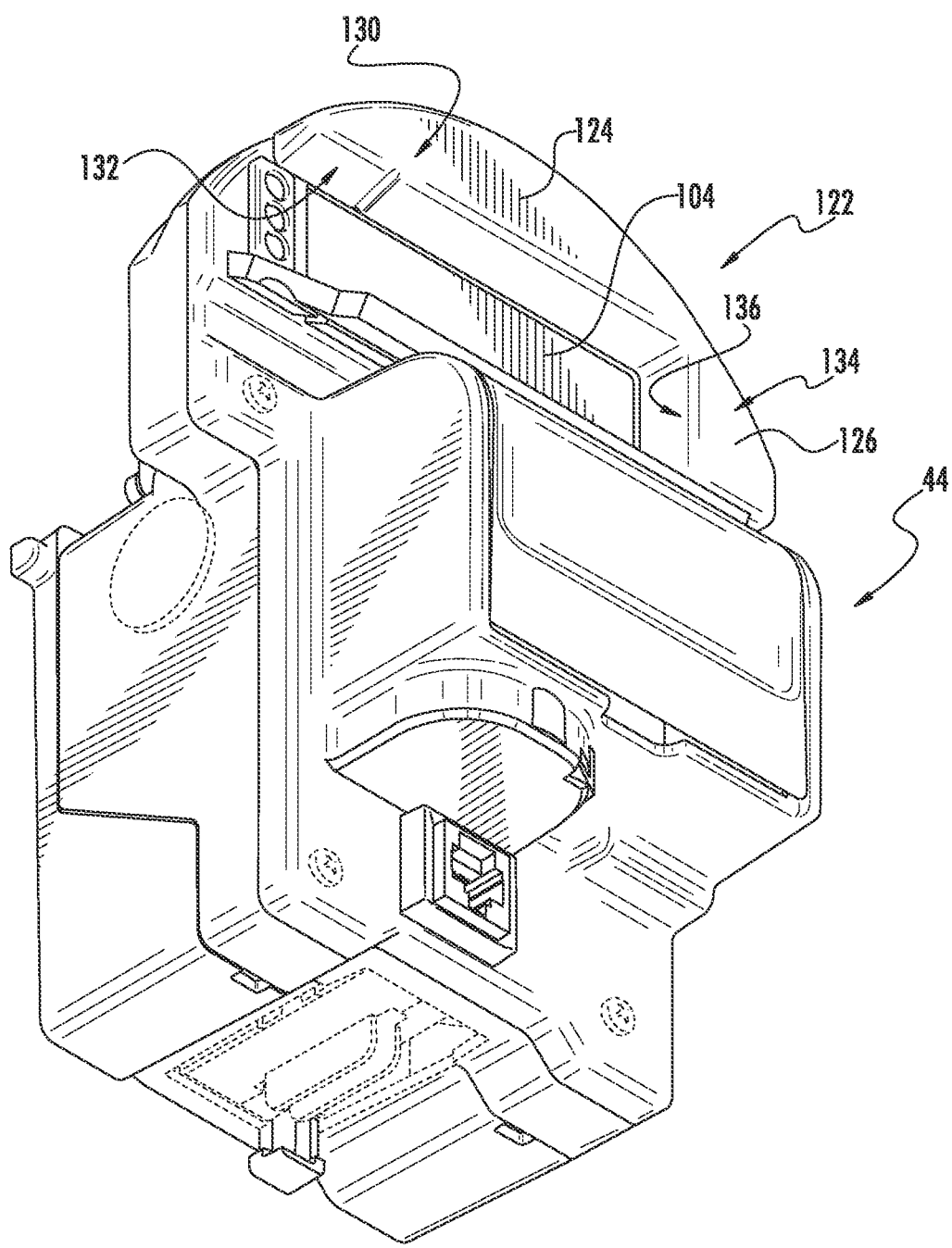
FIG. 9 is a rear view from below of the electronic single-space parking meter mechanism of FIG. 6.

As shown in FIG. 9, upper portion 124 includes a rear facing vertical surface 130 and a lower, downward facing horizontal surface 132. Vertical surface 130 is generally parallel with rear display 104 and extends downward from and substantially perpendicular from upper surface 128. Horizontal surface 132 extends inward from the lower edge of vertical surface 130 and is substantially perpendicular to the vertical plane defined by rear display 104. The inner edge of horizontal surface 132 is located immediately above the upper edge of rear display 104.

Lateral antenna housing portion 126 includes a rear facing vertical surface 134 and a lateral facing (specifically a left facing) vertical surface 136. Rear facing vertical surface 134 extends downward from and is contiguous and coplanar with rear facing vertical surface 130 of upper portion 124. Lateral facing vertical surface 136 extends toward rear display 104 from an inner edge of rear facing vertical surface 134 and the inner edge of lateral facing vertical surface 136 is located immediately adjacent to the lateral edge of rear display 104. In this arrangement, lateral facing vertical surface 136 is perpendicular to horizontal surface 132 and intersect each other adjacent to the upper right corner of rear display 104. In one embodiment, at least a portion of antenna 66 is located within upper portion 124 and is also located above rear display 104 and/or above rear solar panel 120. In one such embodiment, antenna 66 is completely located within upper portion 124 above rear display 104 and above rear solar panel 120.

In various embodiments, lateral antenna housing portion 126 provides an open space within the antenna housing that facilitates transmission of the signal from antenna 66. Further, lateral antenna housing portion 126 provides a third engagement point on antenna housing 122 that engages fastener 105 at a position adjacent to the lateral edge of display 104. Fasteners 107 and 109 engage upper portion 124 at positions above display 104. Fastener 105 along with fasteners 107 and 109 provide for stable attachment of antenna housing 122 to the rest of the inner housing of meter mechanism 44. In one embodiment, lateral portion 126 provides a protective housing and support for a wired communication link (e.g., a wired connection) that runs from an antenna 66 located within upper portion 124 to the other communications hardware and processing systems located within the main body portion of inner housing 46.

Figure 10:
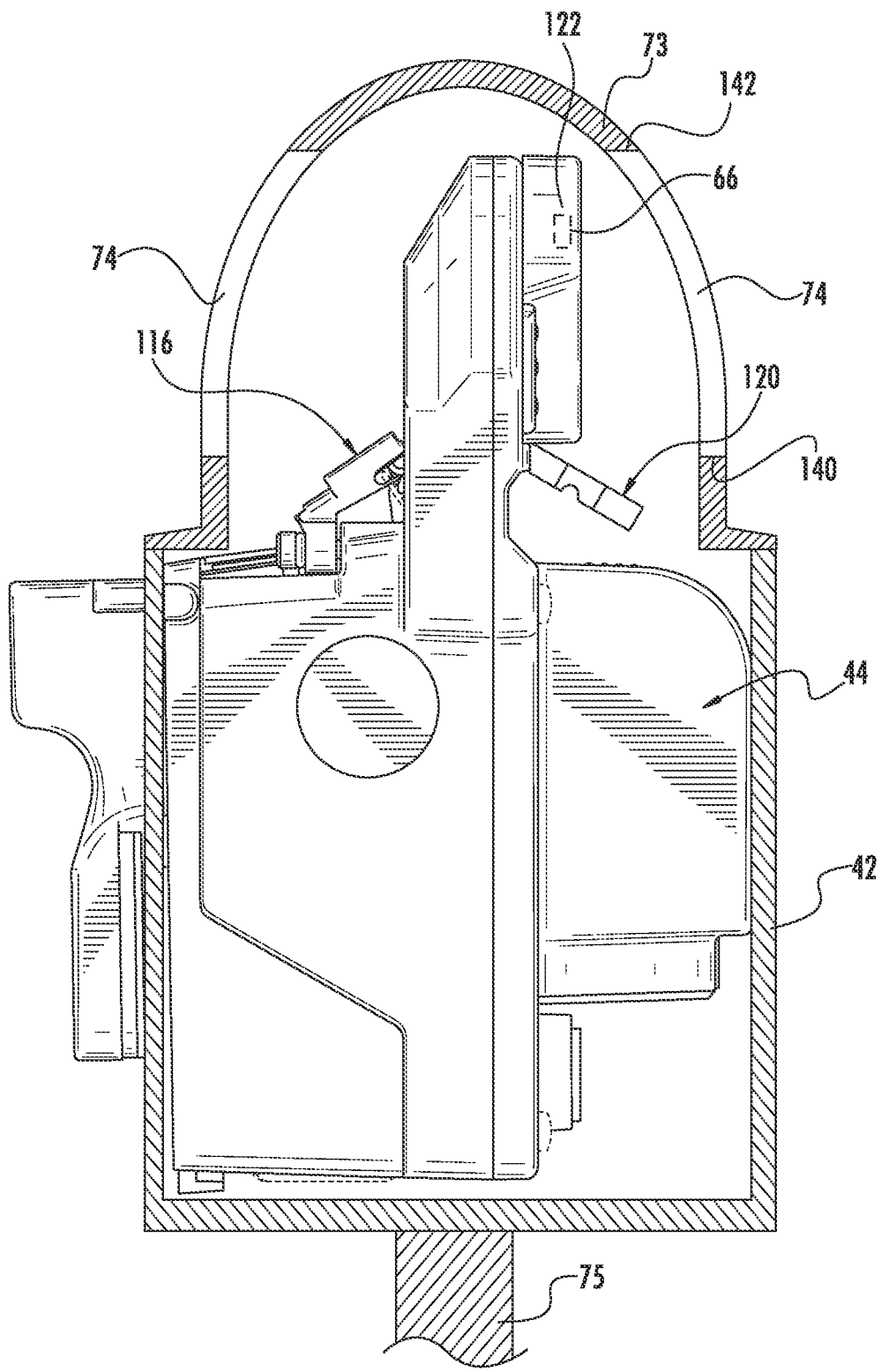
FIG. 10 is a side view showing the electronic single-space meter mechanism of FIG. 6 shown within an outer meter housing according to an exemplary embodiment.

Referring to FIG. 10, a view of electronic meter mechanism 44 located within outer meter housing 42 is shown according to an exemplary embodiment. As shown in FIG. 10, cap 73 is coupled to base 71 such that meter mechanism 44 is enclosed within outer meter housing 42. Meter mechanism 44 is structured such that antenna 66 located within antenna housing 122 is permitted to receive and transmit data from within outer meter housing 42. In one such embodiment, at least a portion of antenna housing 122 and a portion of antenna 66 are located above lower edge 140 of window 74. In one embodiment, at least a portion of antenna housing 122 and a portion of antenna 66 are located below (i.e., at a lower position as measured along the vertical axis of the meter mechanism) upper edge 142 of window 74. In various embodiments, the positioning of antenna housing 122 and of antenna 66 as well as the material of window 74 allows for transmission and receipt of wireless communication signals (e.g., RF signals, wifi signals, cellular telephone signals) through the material of window 74. In various embodiments, the positioning of antenna housing 122 and of antenna 66 allows for transmission and receipt of wireless communication signals (e.g., RF signals, wifi signals, cellular telephone signals) that comply with applicable standards and regulations. In various embodiments, window 74 may be made from a transparent or translucent material (e.g., clear plastic or glass). In one such embodiment, window 74 is made from a strengthened or reinforced transparent or translucent material that resists breaking. Further, the arrangement of antenna housing 122 described above provides for space within inner housing 46 in which to hold antenna 66 while providing an unobstructed view of rear display 104.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. An electronic single-space parking meter mechanism comprising:
    an inner housing including a front side and a rear side and a upper surface extending between the front side and the rear side;
    a wireless communications circuit supported by the inner housing configured to wirelessly receive and transmit at least one of parking payment, vehicle sensor, management, and meter data;
    an antenna coupled to the wireless communications circuit;
    a payment reader supported by the inner housing; and
    an electronic display supported by the inner housing and comprising a front facing display located on the front side of the inner housing and a rear facing display indicator located on the rear side of the inner housing, wherein the antenna is supported from the rear side of the inner housing above the rear facing display indicator and extend horizontally outward from the rear side of the inner housing;

wherein the antenna extends outward towards the rear side of the parking meter, wherein at least a portion of the antenna is located above at least a portion of the rear facing display indicator and below the upper surface of the inner housing; and wherein the inner housing includes an antenna housing and the antenna is located within the antenna housing, wherein the antenna housing extends outward in the horizontal direction from a portion of the rear side of the inner housing at a position above at least a portion of the rear facing display indicator.

2. The electronic single-space parking meter mechanism of claim 1, wherein the antenna housing includes a lower surface located above the rear facing display and extending horizontally outward from the rear side of the inner housing and beyond the rear facing display indicator and substantially perpendicular to a plane defined by the rear facing display.

3. The electronic single-space parking meter mechanism of claim 1, wherein the antenna housing includes an upper surface, wherein the upper surface of the antenna housing is a curved surface that curves upwardly between left and right lateral sides of the inner housing.

4. The electronic single-space parking meter mechanism of claim 1, wherein the antenna housing includes an upper portion extending horizontally along an upper edge of the rear facing display indicator and a lateral portion extending downward from the upper portion along a lateral edge of the rear facing display.

5. The electronic single-space parking meter mechanism of claim 1, further comprising a front solar panel positioned below the front facing display and a rear solar panel positioned below the rear facing display indicator.

6. The electronic single-space parking meter mechanism of claim 1, wherein the payment reader includes at least one of a contact and contactless credit card reader and a currency reader.

7. The electronic single-space parking meter mechanism of claim 6, further comprising a keypad located below the currency reader.

8. An electronic parking meter mechanism for insertion into a preexisting outer meter housing, the electronic parking meter mechanism comprising:
an inner housing including a front side and a rear side wherein the inner housing includes an antenna housing and an antenna is located within the antenna housing, wherein the antenna housing extends outward from a portion of the inner housing;
wireless communications hardware, comprising the antenna, supported by the inner housing configured to wirelessly receive and transmit data comprising at least one of parking payment, vehicle sensor, management, and meter data;
a solar panel supported by the inner housing; and
an electronic display supported by the inner housing and comprising a front display screen and a rear display indicator, wherein at least a portion of the antenna housing extends outward from a position above the rear display indicator and contains the antenna;
wherein at least a portion of the antenna is located above a portion of the solar panel;
wherein the at least a portion of the antenna is located offset from the vertical plane separating the front and rear sides of the parking meter device and toward the rear side of the electronic parking meter mechanism; and
wherein the antenna and antenna housing are supported by the inner housing at a position such that the antenna and the antenna housing are located within and below a cap of the parking meter outer housing when the inner housing is inserted into the parking meter outer housing.

9. The electronic parking meter mechanism of claim 8, wherein the electronic display is located above the solar panel, wherein the at least a portion of the antenna extends in the horizontal direction beyond a plane defined by the electronic display.

10. The electronic parking meter mechanism of claim 8, wherein the inner housing includes a curved upper surface that extends between the front and rear sides in the horizontal direction, wherein the at least a portion of the antenna is located below the upper curved surface.

11. The electronic parking meter mechanism of claim 8, wherein the antenna housing includes an upper portion extending horizontally along an upper edge of the rear facing indicator and a lateral portion extending downward from the upper portion along a lateral edge of the rear facing indicator.

12. The electronic parking meter mechanism of claim 8, further comprising a credit card reader, a keypad and a currency reader, wherein the inner housing is sized to fit completely within a single-space meter outer housing.

13. A single-space parking meter assembly comprising:
an electronic meter mechanism comprising:
an inner housing including a front side and a rear side wherein the inner housing includes an antenna housing extending horizontally outward from the rear side of the inner housing with an antenna located within the antenna housing;
wireless communications hardware supported by the inner housing configured to wirelessly receive and transmit data comprising at least one of parking payment, management, vehicle sensor and meter data, the wireless communications hardware comprising the antenna; and
an electronic display supported by the inner housing comprising a front display screen and a rear display indicator with the antenna and the antenna housing being locating above the rear display indicator; and
an outer housing comprising:
a base defining a cavity sized to receive a lower portion of the electronic meter mechanism;
a cap configured to be coupled to the base over an upper portion of the electronic meter mechanism; and
a window supported by the cap, the window having a lower edge and an upper edge;
wherein the electronic display screen is supported by the inner housing at a position such that the display is viewable through the window after the cap is coupled to the base, and further wherein the antenna is supported by the inner housing at a position such that the antenna and antenna housing are located within and below the cap and is located above the lower edge of the window after the cap is coupled to the base when the inner housing is received in the base.

14. The single-space parking meter assembly of claim 13, wherein the electronic meter mechanism includes a solar panel supported by the inner housing, wherein the antenna is located above at least a portion of the solar panel.

15. The single-space parking meter assembly of claim 13, wherein the antenna is located below an upper edge of the window.

16. The electronic parking meter mechanism of claim 8, wherein a portion of the electronic display is located above a portion of the solar panel, and wherein further the at least a portion of the antenna is located in the horizontal direction towards the rear side of the electronic parking meter mechanism.

17. The electronic parking meter mechanism of claim 8, wherein a portion of the electronic display is located above a portion of the solar panel, and wherein further the at least a portion of the antenna primarily receiving or transmitting vehicle sensor data is placed at a location offset in the horizontal direction towards the rear side of the electronic parking meter mechanism.

\* \* \* \* \*